(12) United States Patent
Rowe

(10) Patent No.: US 7,218,356 B2
(45) Date of Patent: May 15, 2007

(54) SYSTEM AND METHOD FOR INDUCTIVE LINE SYNCHRONIZATION

(75) Inventor: David Rowe, Campbell Hill, NY (US)

(73) Assignee: Pelco, Clovis, CA (US)

( * ) Notice: Subject to any disclaimer, the term of this patent is extended or adjusted under 35 U.S.C. 154(b) by 0 days.

(21) Appl. No.: 11/285,000

(22) Filed: Nov. 22, 2005

(65) Prior Publication Data

US 2006/0077257 A1    Apr. 13, 2006

Related U.S. Application Data

(63) Continuation of application No. 10/106,469, filed on Mar. 26, 2002, now abandoned.

(60) Provisional application No. 60/280,875, filed on Apr. 2, 2001.

(51) Int. Cl.
*H04N 9/475* (2006.01)
*H04N 5/04* (2006.01)
*H04N 5/073* (2006.01)

(52) U.S. Cl. .................... 348/521; 348/516; 348/153; 348/143; 348/705; 348/14.11

(58) Field of Classification Search ............. 348/521, 348/536, 537, 730, 518, 516, 153, 139, 222.1, 348/14.11, 705, 706, 495, 143, 159; 345/213, 345/212; 315/276, 266, 254; 327/86, 190; 333/119; 323/215, 355
See application file for complete search history.

(56) References Cited

U.S. PATENT DOCUMENTS

| | | | |
|---|---|---|---|
| 3,582,758 A * | 6/1971 | Gunn | 363/127 |
| 3,816,658 A | 6/1974 | Vidovic | |
| 3,916,402 A | 10/1975 | Homung | |
| 4,047,079 A * | 9/1977 | MacPhee | 361/45 |
| 4,246,845 A * | 1/1981 | Winton et al. | 102/206 |
| 4,460,951 A | 7/1984 | Fenter et al. | |
| 4,670,786 A | 6/1987 | Ricciardi | |
| 4,763,193 A | 8/1988 | DeVilbiss | |
| 4,860,101 A | 8/1989 | Pshtissky et al. | |
| 4,970,623 A | 11/1990 | Pintar | |
| 5,072,158 A | 12/1991 | Schuda | |

(Continued)

FOREIGN PATENT DOCUMENTS

JP            3222584 A      10/1991

*Primary Examiner*—David Ometz
*Assistant Examiner*—Jean W. Désir
(74) *Attorney, Agent, or Firm*—Paul T. Kashimba, Esq.

(57) ABSTRACT

A synchronization signal generating apparatus and method in which an input circuit is inductively coupled to an alternating current signal line. The input circuit generates a rectified signal. A switch has a switch input and a switch output in which the switch input is electrically connected to the input circuit and is enabled when the voltage of the rectified signal is greater than a predetermined voltage and is disabled when the rectified signal voltage is less than the predetermined voltage. A pulse generating circuit has a pulse generating circuit input and a pulse generating circuit output. The pulse generating circuit input is electrically connected to the switch output. The pulse generating circuit generates a pulse each time the switch is enabled. The synchronization signal generating apparatus is used in a synchronized television display system to signal a video switch to switch the video signal generated by a camera to a monitor based on the occurrence of the synchronization signal.

23 Claims, 3 Drawing Sheets

U.S. PATENT DOCUMENTS

| | | |
|---|---|---|
| 5,166,793 A | 11/1992 | Furukawa et al. |
| 5,325,202 A | 6/1994 | Washino |
| 5,391,977 A | 2/1995 | Beland |
| 5,517,236 A | 5/1996 | Sergeant et al. |
| 5,589,891 A | 12/1996 | McCracken et al. |
| 5,793,587 A * | 8/1998 | Boteler ........................ 361/42 |
| 6,191,814 B1 | 2/2001 | Elberbaum |
| 6,278,266 B1 * | 8/2001 | Glasband ................... 323/355 |
| 6,738,275 B1 | 5/2004 | Beland |

* cited by examiner

SYSTEM AND METHOD FOR INDUCTIVE LINE SYNCHRONIZATION

CROSS-REFERENCE TO RELATED APPLICATIONS

This application is a continuation of application Ser. No. 10/106,469, filed Mar. 26, 2002, now abandoned, which claims priority from provisional patent application Ser. No. 60/280,875, filed Apr. 02, 2001 all of which are incorporated herein by reference.

STATEMENT REGARDING FEDERALLY SPONSORED RESEARCH OR DEVELOPMENT n/a

FIELD OF THE INVENTION

The present invention relates to a system and method for electronic circuit synchronization pulse generation and, in particular, to a system and method for generating a synchronization signal based on inductively-sensed power line phase.

BACKGROUND OF THE INVENTION

Video switching systems such as those used in the closed circuit television ("CCTV") industry often operate with non-synchronized cameras, i.e. the blanking intervals on the cameras are not synchronized to occur at the same time or synchronized with the switch. When different cameras are selected, the display monitor often loses vertical lock, and the image "rolls" badly until it re-locks. This situation can be improved in the cameras when the command to switch is synchronized with the input alternating current ("AC") power line frequency. As such, it is desirable to switch the video signal during the vertical blanking interval to prevent roll and start the new picture frame at the beginning of the next raster scan.

Prior art devices have been used to synchronize video switches to the 60 Hertz power input using optical couplers, capacitors, or zero-crossing detectors such as triacs. However, these prior art devices necessitated one of two undesirable solutions. First, the 120 volt AC line signal must be brought onto a circuit board or coupled to a circuit to perform the synchronization function. Second, a common way to lock to the power line is to detect zero-crossings at the low voltage secondary of the input power transformer by using a comparator. However, with contemporary direct, off-switching power supplies, such a transformer is not used. As such, this solution is impractical. Also, if an attempt is made to sample the raw input line, the detector must operate at high voltages, provide line isolation, and meet all certifications such as Underwriters Laboratories ("UL"), Federal Communications Commission ("FCC") and other related certifications. This is expensive and difficult.

Systems for synchronizing a plurality of cameras using a master source located at a central station are known. However, the device at the central station is typically a highly-complicated device which distributes both horizontal and vertical synchronization signals. These systems do not, however, provide a synchronization signal to a central video switch which is used to switch between cameras during their vertical blanking interval.

It is therefore desirable to be able to have a system and method which avoids the need to sample the raw input line and cause the detector to operate at high voltages. It is further desirable to have a system and method for providing a synchronization signal based on the AC power line signal which does not require certifications and which allows the use of contemporary direct off-line switching power supplies without the need for a separate transformer.

SUMMARY OF THE INVENTION

According to one aspect, the present invention provides a synchronization signal generating apparatus in which an input circuit is inductively coupled to an alternating current signal line. The input circuit generates a rectified signal. A switch has a switch input and a switch output in which the switch input is electrically connected to the input circuit and is enabled when a voltage of the rectified signal is greater than a predetermined voltage and is disabled when the rectified signal voltage is less than the predetermined voltage. A pulse generating circuit has a pulse generating circuit input and a pulse generating circuit output in which the pulse generating circuit input is electrically connected to the switch output. The pulse generating circuit generates a pulse each time the switch is enabled.

According to another aspect, the present invention provides synchronized television display system in which a plurality of cameras each generate a respective video signal. A monitor is adapted to display a video signal generated by at least one of the plurality of cameras. A video selection unit is electrically coupled to the plurality of cameras and the monitor in which the video selection unit includes a synchronization circuit inductively coupled to an alternating current signal line. The synchronization circuit is adapted to generate a synchronization signal corresponding to a phase of the alternating current signal line and the video selection unit is arranged to switch the video signal generated by a selected camera to the monitor based on the occurrence of a synchronization signal.

According to still another aspect, the present invention provides a method for synchronizing display of a switched video signal to occur during a vertical blanking interval of a monitor in which a phase of an alternating current line signal is inductively sensed. A synchronizing signal is generated in which the synchronizing signal is derived from the inductively sensed phase of the alternating current line signal. The display on the monitor is switched from one video signal to another upon the occurrence of a synchronizing signal. According to yet another aspect, the present invention provides a method for generating a synchronization pulse in which an input circuit is inductively coupled to an alternating current signal line. The input circuit generates a rectified signal. A switch is enabled when the rectified signal voltage is greater than a predetermined voltage. The switch is disabled when the rectified signal voltage is less than the predetermined voltage. The synchronization pulse is generated each time the switch is enabled.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
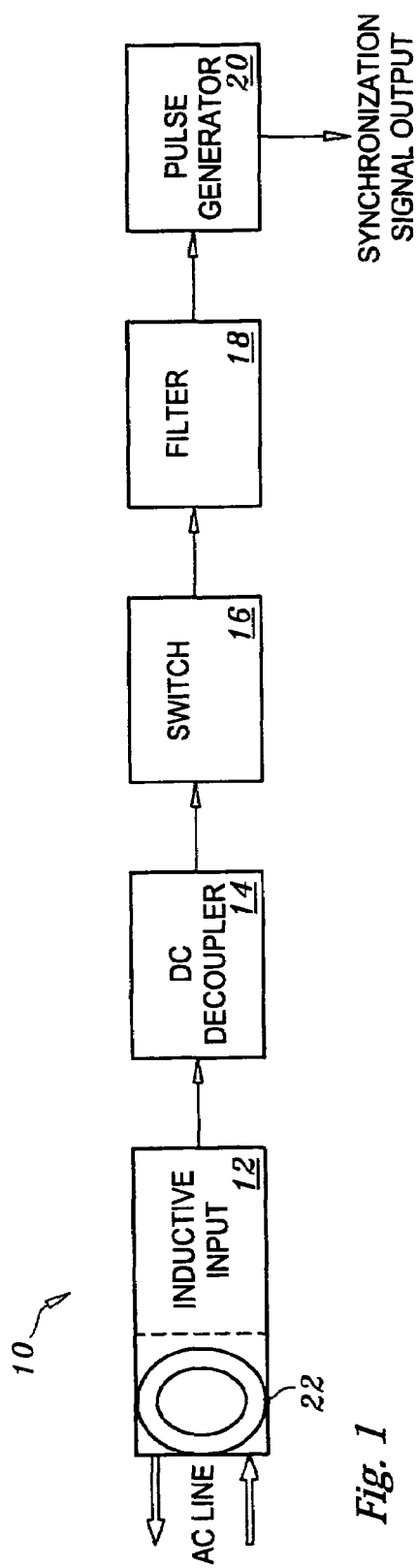
FIG. 1 is a block diagram of a synchronization signal generation apparatus constructed in accordance with the principles of the present invention.

Referring now to the drawing figures in which like reference designators refer to like elements, there is shown in FIG. 1 a synchronization signal generation apparatus constructed in accordance with the principles of the present invention and are designated generally as "10". Synchronization signal generation apparatus 10 advantageously provides a way to generate a synchronization signal in the form of a pulse in which the synchronization signal is derived from the phase of an alternating current ("AC") line signal but which is electrically isolated from the AC line signal. By inductively coupling synchronization apparatus 10 to the AC line, the present invention obviates the need for board level circuitry to accommodate the high voltage AC line (other than the power supply), thereby obviating the need for systems which use apparatus 10 to be subjected to safety and electromagnetic interference testing such as Underwriters Laboratories and Federal Communication Commission testing based on the synchronization signal generator apparatus 10 of the present invention.

Synchronization signal generation apparatus preferably includes inductive input 12, direct current ("DC") decoupler 14, electronic switch 16, filter 18 and pulse generator 20. As is seen in FIG. 1, the input of inductive input 12 is inductively coupled to the AC line signal. The output of inductive input 12 is electrically coupled to the input of DC decoupler 14. The output of DC decoupler 14 is electrically coupled to the input of electronic switch 16. The output of electronic switch 16 is electrically coupled to the input of filter 18 and the output of filter 18 is electrically coupled to the input of pulse generator 20. Each of the above-mentioned devices is described in detail below.

Figure 2:
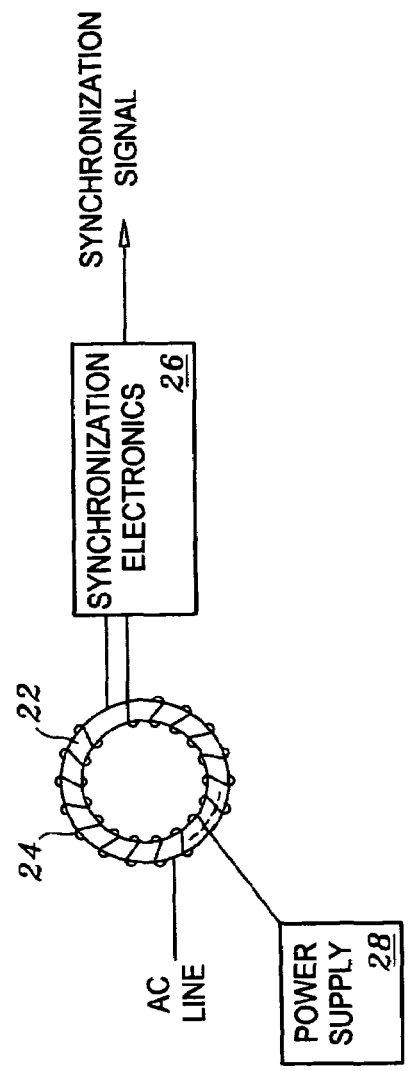
FIG. 2 is a diagram of a toroidal transformer coupled to synchronization electronics.

Inductive input 12 includes a transformer such as toroidal transformer 22 used to electrically isolate the AC line signal from the remainder of inductive input 12 and the other components in apparatus 10. As shown in FIG. 2, toroidal transformer 22 has secondary windings 24 coupled to synchronization electronics 26. Synchronization electronics 26 include the elements of inductive input 12 other than toroidal transformer 22 and includes DC coupler 14, electronic switch 16, filter 18, and pulse generator 20. As the primary winding for toroidal transformer 22, one of the AC signal line wires is passed through the center of toroidal transformer and wrapped around the core of the transformer a few times, for example two times. In this manner, a small voltage having the same phase as the AC signal line is developed across the secondary winding and input into synchronization electronics 26. The AC signal line is coupled to power supply 28 as is found in devices which employ the inventive apparatus 10.

Practically speaking, power supply 28 is typically a direct switching power supply. As such, in accordance with the present invention, a special transformer need not be integrated nor used in the system power supply. One AC line need only be wrapped through transformer 22 to provide the appropriate inductive input to apparatus 10. In this manner, the phase of the AC signal line can be efficiently detected and used to synchronize system components described below in detail.

Referring again to FIG. 1, inductive input 12 is arranged to provide at its output a rectified signal to the input of DC decoupler 14. The rectified signal is a half wave signal, such as the positive half wave corresponding to the phase of the AC signal line. The voltage of the rectified signal is greatly reduced as compared to the AC signal line due to the winding ratio of transformer 22. For example, a 60 Hz AC signal line will yield a 60 Hz rectified half wave.

Because it is possible that the output of inductive input 12 may have some DC components, DC decoupler is used to filter any DC components from inductive input 12. The resultant output of DC decoupler provided to electronic switch 16 is a half wave rectified signal substantially devoid of any DC component.

Electronic switch 16 is coupled to DC decoupler 14 and is adapted to provide a substantially binary signal sufficient to drive pulse generator 20. Electronic switch 16 is turned on when the input to electronic switch is greater than a predetermined voltage, such as approximately 2.7 volts in the case of a 60 Hz 120V AC signal line and turns off when the switch input voltage drops below the predetermined input voltage value.

Filter 18 is arranged to receive at its input the binary signal outputs by switch 16 and to clean the signal by filtering undesired noise. The resultant output is fed into the input of pulse generator 20. Pulse generator 20 can be any device suitable for generating a binary pulse, such as a Schmitt trigger. The output of pulse generator 20 is the output of apparatus 10 and represents an inductively derived pulse synchronization signal which is synchronized with the AC signal line.

Figure 3:
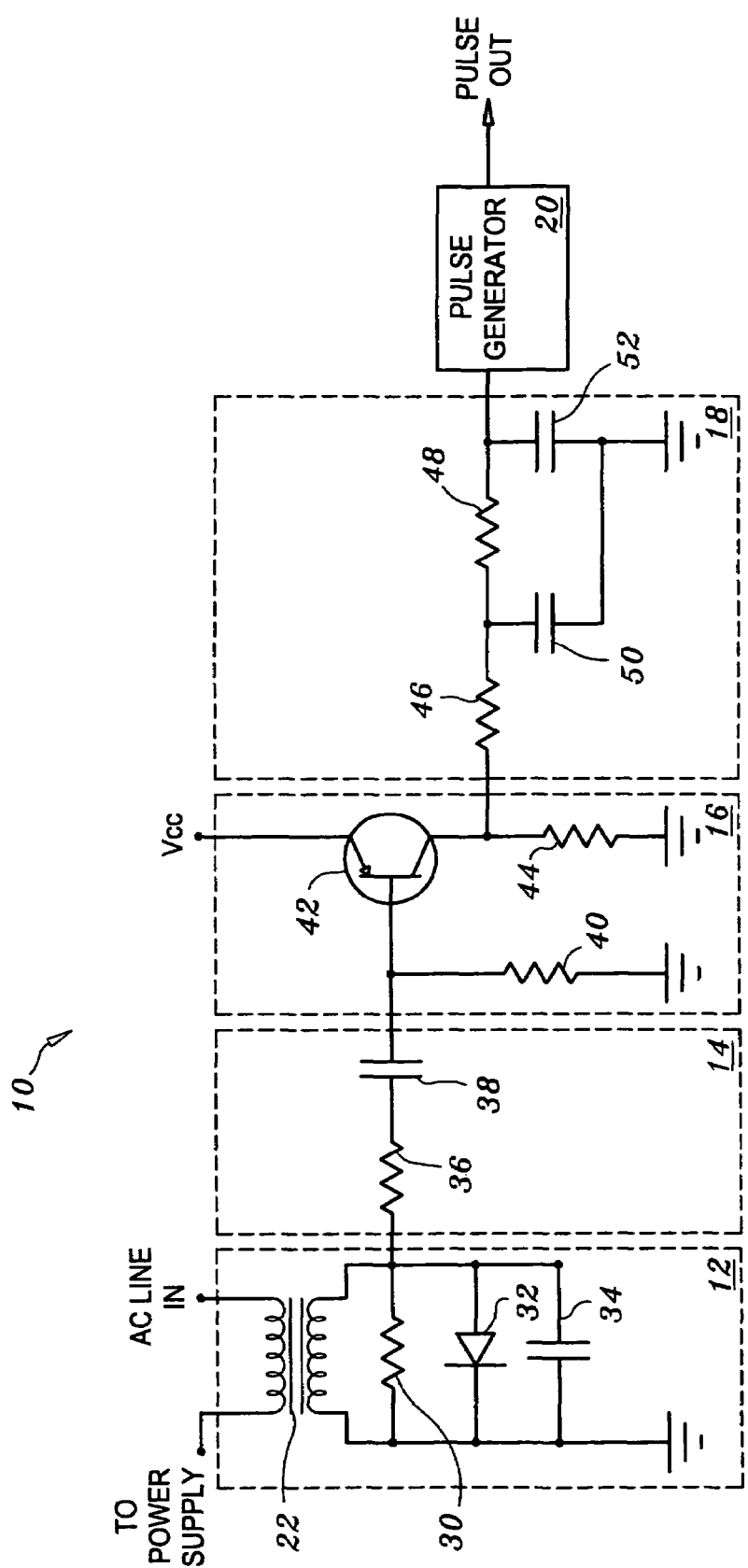
FIG. 3 is a schematic diagram of an embodiment of a synchronization signal generation apparatus.

An exemplary embodiment of apparatus 10 is described with reference to FIG. 3, it being understood, however, that many other combinations of components can be implemented by those of ordinary skill in the art to achieve the functionality of the present invention. As shown in FIG. 3, input circuit 12 includes transformer 22, described above in detail and with resistor 30, diode 32, and capacitor 34 coupled in parallel with the secondary winding of transformer 22. One end of the parallelly-connected components, namely resistor 30, the cathode of diode 32 and capacitor 34 are grounded, while the other ends of these components are coupled together to form the output of inductive input 12. In accordance with this arrangement, a voltage signal is developed across resistor 30 in phase with the AC line signal. Diode 32 functions to half wave rectify the signal derived across the secondary winding of transformer 22 and capacitor 34 filters the rectified wave.

DC decoupler 14 includes resistor 36 and capacitor 38, connected in series between the input and output of DC decoupler 14. Values suitable to filer the DC component can be selected by those of skill in the art.

Electronic switch 16 includes shunt resistor 40, transistor 42 and emitter resistor 44. Shunt resistor 40 shunts electronic switch input to ground. The collector of transistor 42 is coupled to the circuit voltage supply, the base of transistor 42 is coupled to the ungrounded end of shunt resistor 40 and the emitter of transistor 42 serves as the output of electronic switch 16. Emitter resistor 44 shunts the emitter of transistor 42 to ground and serves as a pull down for transistor 42.

As shown in FIG. 3, filter resistors 46 and 48 and capacitors 50 and 52 are arranged to from a double pole low pass filter. Of course any suitable filter arrangement can be used to clean the substantially binary output of electronic switch 16 for input into pulse generator 20.

Table 1 lists sample values for the components shown in FIG. 3.

TABLE 1

| Reference Designator | Value |
| --- | --- |
| 20 | 74VHC132D |
| 30 | 3.9 KΩ |
| 32 | 1N914_S |
| 34 | 0.1 µF |
| 36 | 1.2 KΩ |
| 38 | 0.1 µF |
| 40 | 560 KΩ |
| 42 | MMBT2907 |
| 44 | 5.1 KΩ |
| 46 | 30 KΩ |
| 48 | 75 KΩ |
| 50 | 100 pF |
| 52 | 100 pF |

It has been found that using the components listed in Table 1 along with a Vcc equal to 3.3 volts and a 60 Hz 120 volt AC signal line yields an approximately 800 millivolt half wave rectified sine wave at the output of inductive input 12, approximately a 2.6 volt 60 Hz HALF wave rectified signal with substantially no DC component at the base of transistor 42. Use of the 3.3 volt logic 74VHC132D Schmitt trigger for pulse generator 20 provides approximately a 1 millisecond 3.3 volt pulse every 16.67 milliseconds. By comparison, a 50 Hz AC signal line yields the approximately 1 millisecond pulse every 20 milliseconds. In either case, the synchronization signal output by pulse generator is synchronized with the peak wave of the AC line signal.

Figure 4:
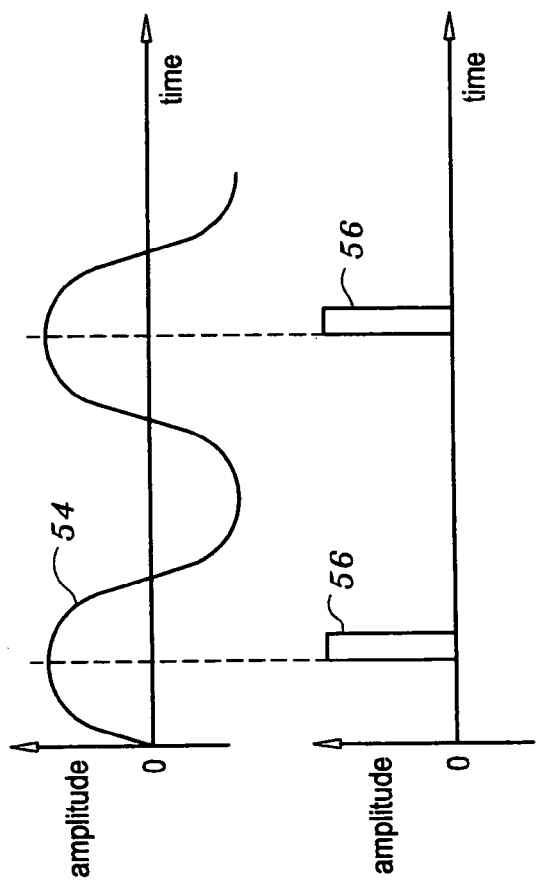
FIG. 4 is a graph of a synchronization signal generated by a synchronization signal generation apparatus compared with an AC line signal.

FIG. 4 illustrates an example of a synchronization signal generated by apparatus 10 as compared with an AC line signal. Referring to FIG. 4, the AC line signal is shown as sinusoid AC line signal 54. The synchronization pulse outputted by pulse generator 20 is shown as synchronization pulse 56. As discussed above, where sinusoid line signal 54 is a 60 hertz signal, use of the components shown in Table 1 yields a synchronization pulse 56 having approximately a 1 millisecond duration every 16.67 milliseconds. Of note, the amplitude of sinusoid AC line signal 54 and synchronization pulse 56 are not drawn to scale with respect to one another. Rather, the amplitude of synchronization pulse 56 is magnified for ease of understanding. Also, it should be noted that the leading edge of synchronization pulse 56 occurs at approximately the positive peak of sinusoid AC line signal 54.

The synchronization signal generated by apparatus 10 is advantageously well suited for use in a system which benefits from synchronization with an AC line source. For example, a CCTV security system typically uses video switches to switch the video signal generated by a plurality of cameras to a display monitor. In this case, the vertical blanking interval of the monitor is synchronized with AC line signal, assuming the monitor is powered from the same source as the video switch.

Figure 5:
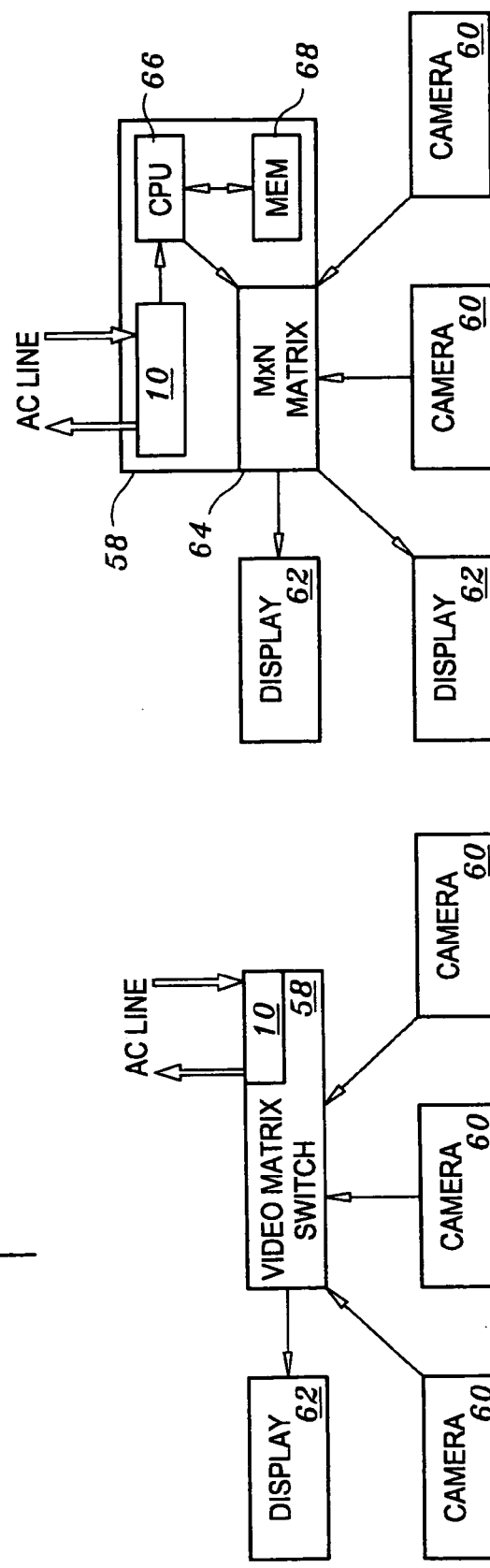
FIG. 5 is a block diagram of an exemplary system implementing the synchronization signal generation apparatus of the present invention.

An exemplary implementation of apparatus 10 as embodied in a video matrix switch is described with reference to FIG. 5. As shown in FIG. 5, an exemplary system implementing apparatus 10 includes at least one video matrix switch 58, one or more cameras 60, and one or more display monitors 62. Each of cameras 60 generates a respective video signal for transmission to video matrix switch 58. Display monitor 62 is adapted to display a video signal generated by at least one of cameras 60. Video matrix switch 58 is electrically coupled to cameras 60 and display monitor 62. As shown in FIG. 5, video matrix switch 58 includes synchronization apparatus 10. Synchronization apparatus 10 is inductively coupled to an alternating current line. As discussed above, synchronization apparatus 10 is adapted to generate a synchronization signal corresponding to the phase of the alternating current line.

Figure 6:
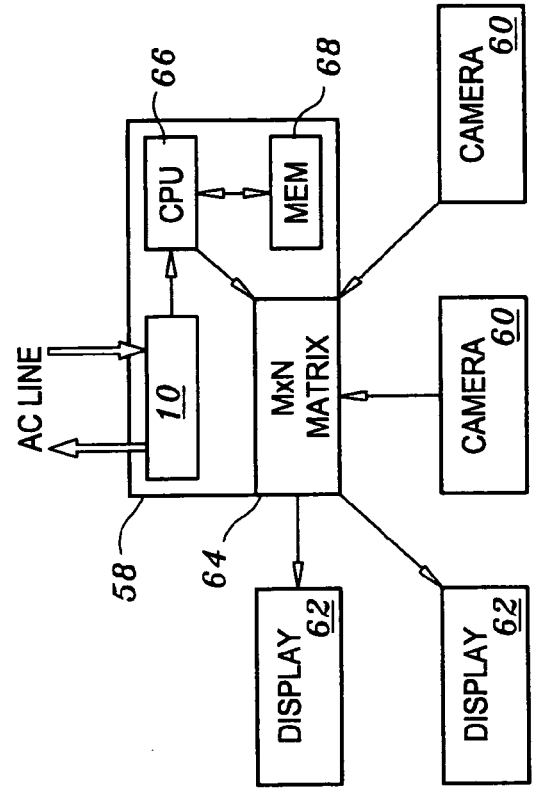
FIG. 6 is a block diagram of a video matrix switch arranged to implement the synchronization signal generation apparatus of the present invention.

FIG. 6 shows a more detailed view of video matrix switch 58 arranged to implement synchronization apparatus 10. As shown in FIG. 6, video matrix switch 58 further includes switch matrix 64 and central processing unit ("CPU") 66. Switch matrix 64 is arranged to be in electrical communication with central processing unit 66, cameras 60, and displays 62. In operation, switch matrix 64 electrically couples a video signal from a camera 60 to display monitor 62 when it receives a display authorization signal from CPU 66. Switch matrix 64 is typically an N×M matrix which can electrically couple a camera 60 to a display 62.

In accordance with the present invention, CPU 66 can be any central processing unit capable of supporting the functions of a video matrix switch and those described with respect to the present invention. CPU 66 can be a microcontroller, or any other processing device, sized in accordance with the expected performance requirements of video matrix switch 58. For example, a video matrix switch which is designed to support a large number of cameras 60 and/or displays 62 will likely have a central processing unit larger in size than that used to support a smaller sized switch matrix 64.

Video matrix switch 58 may also include a memory 68 which stores a set of switching instructions. The switching instructions represent a display time duration for which a display 62 will display the image captured by a camera 60. This feature is sometimes referred to as vertical interval switching. In this manner, a display 62 can be made to sequentially display the images from a plurality of cameras 60. For example, the system may be programmed such that a display monitor 62 may display the image from a camera for 10 seconds, then another camera for 5 seconds, and still another camera for 20 seconds. In this manner, an operator viewing the display 62 will see a sequence of images being captured by different cameras. In operation, CPU 66 executes programmatic code which causes video switch 58 to provide display monitor 62 with a video signal from the camera 60 determined in accordance with previously stored switching instructions as described above. The prestored switching instructions include one or more display time durations during which display monitor 62 will display the video signal for corresponding camera 60. CPU 66 authorizes switch matrix 64 to switch from one camera 60 to another based on the prestored switching instruction data.

The present invention advantageously incorporates the additional aspect of the synchronization pulse generated by synchronization circuit 10. In accordance with the present invention, the authorization signal provided by CPU 66 to switch matrix 64 is not transmitted to switch matrix 64 to authorize the switch from one camera 60 to another until a synchronization signal is provided by synchronization circuit 10 to CPU 66.

In this manner, because the synchronization signal coincides with the positive peak of the AC line signal, display monitor 62, which uses the same AC power source as video switch matrix 58, will be operating during its vertical blanking interval at the time the synchronization signal is transmitted to CPU 66. As such, by delaying the transmission of the authorization signal from CPU 66 to switch matrix 64 until the synchronization signal is received by CPU 66, the present invention advantageously avoids picture roll on display monitor 62 as would otherwise be the case if the video signal were switched from one camera 60 to another during a non-vertical blanking interval of display monitor 62. In other words, by synchronizing the switch of the video signal from one camera 60 to another during the vertical blanking interval despite the elapse of a prestored display time duration for a particular video signal, an operator watching display monitor 62 will see a smooth transition from one video signal to another without the picture rolling and desynchronizing.

It is contemplated that the synchronization signal provided by synchronization circuit 10 to CPU 66 can be provided as a CPU processor interrupt signal. Further, although not shown, it is contemplated that additional logic devices such as programmable logic devices ("PLD") can be provided between synchronization circuit 10 and CPU 66 to further logically control CPU 66 and provide additional interrupt logic.

The present invention advantageously provides a circuit which avoids the problems associated with electrically coupling an AC signal line to components other than a power supply to derive a synchronization signal based on a phase of the AC signal line. The present invention accomplishes this feature by using a transformer such as a toroidal transformer to inductively couple the AC signal line to the synchronization signal generating components. Further, the present invention advantageously provides a way to implement the synchronization signal generating apparatus by using the synchronization signal as a way to effect the switching of a video signal from one camera to another on a display monitor during the vertical blanking interval of the display monitor so as to avoid undesirable display characteristics such as picture roll. The present invention therefore provides an economical and safe solution for generating synchronization signals for use in CCTV systems.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A synchronized television display system comprising: a plurality of cameras generating video signals; a monitor for displaying a video signal generated by one of said plurality of cameras; a video selection unit electrically connected to said plurality of cameras and said monitor, for connecting a selected camera from said plurality of cameras to said monitor; an AC line having an AC signal; and a synchronization unit comprising an AC line sensing device comprising a core and a coil wrapped around said core for generating a signal corresponding to the AC signal on said AC line and a synchronization circuit connected to said AC line sensing device for providing a synchronization signal to said video selection unit, wherein said AC line is wrapped around said AC line sensing device and said AC line sensing device is not electrically connected to said AC line and said video selection unit switches the video signal generated by a selected camera from said plurality of cameras to said monitor based on the occurrence of the synchronization signal.

2. The synchronized television display system according to claim 1, wherein the video selection unit further includes a central processing unit electronically coupled to the synchronization circuit, the central processing unit receiving the synchronization signal and causing the video signal generated by the selected camera to be switched to the monitor.

3. The synchronized television display system according to claim 2, wherein the central processing unit generates a display authorization signal based at least in part on the receipt of the synchronization signal.

4. The synchronized television display system according to claim 3, wherein the video selection unit further includes a switch matrix in electrical communication with the central processing unit, the plurality of cameras and the monitor the switch matrix electrically coupling the video signal from the selected camera to the monitor upon receipt of the display authorization signal from the central processing unit.

5. The synchronized television display system according to claim 3, wherein the central processing unit executes programmatic code which performs the function of causing the video switch to provide the monitor with a video signal from a camera determined in accordance with previously stored switching instructions, the switching instructions including at least one display time duration for which the monitor will display the video signal for a corresponding camera, wherein the central processing unit generates the display authorization signal upon the expiration of a display time duration and upon receipt of the synchronization signal.

6. The synchronized television display system according to claim 3, wherein the synchronization signal is provided to the central processing unit as an interrupt signal.

7. A synchronized television display system as recited in claim 1, wherein said synchronization circuit comprises a rectifier connected to said AC line sensing device to rectify the signal from said AC line sensing device, a switch connected to said rectifier, said switch being enabled when the signal from said rectifier is greater than a predetermined level and disabled when the signal from said rectifier is less than the predetermined level, and a pulse generating circuit connected to said switch, said pulse generating circuit generating the synchronization signal each time said switch is enabled.

8. A synchronized television display system as recited in claim 1, wherein said synchronization unit is adapted to generate a synchronization signal corresponding to a phase of the AC line signal.

9. A synchronized television display system as recited in claim 1, wherein said video selection unit switches the video signal generated by a selected camera from said plurality of cameras to said monitor during a vertical blanking interval of said monitor.

10. A synchronized television display system as recited in claim 1, wherein said AC line has two lines and only one of said two lines is wrapped round said AC line sensing device.

11. A synchronized television display system as recited in claim 10, wherein said one AC line that is wrapped around said AC line sensing device is wrapped around the core of said AC line sensing device.

12. A synchronized television display system as recited in claim 11, wherein said core is a toroidal core.

13. A synchronized television display system as recited in claim 1, wherein said AC line sensing device is not a transformer.

14. A synchronized television display system as recited in claim 1, wherein said AC line sensing device is a coil.

15. A synchronized television display system comprising: a plurality of cameras generating video signals; a monitor for displaying a video signal generated by one of said plurality of cameras; a video selection unit electrically connected to said plurality of cameras and said monitor, for connecting a selected camera from said plurality of cameras to said monitor; an AC line having an AC signal; a synchronization circuit comprising a toroidal transformer having a core, primary winding, and secondary winding, said AC line being wrapped around said core but not being electrically connected to said primary winding or said secondary winding, said toroidal transformer providing a synchronization signal based on said AC signal and said video selection unit switches the video signal generated by a selected camera from said plurality of cameras to said monitor based on the occurrence of the synchronization signal.

16. The synchronized television display system according to claim 15, wherein the video selection unit further includes a central processing unit electronically coupled to the synchronization circuit, the central processing unit receiving the synchronization signal and causing the video signal generated by the selected camera to be switched to the monitor.

17. The synchronized television display system according to claim 16, wherein the central processing unit generates a display authorization signal based at least in part on the receipt of the synchronization signal.

18. The synchronized television display system according to claim 17, wherein the video selection unit further includes a switch matrix in electrical communication with the central processing unit, the plurality of cameras and the monitor the switch matrix electrically coupling the video signal from the selected camera to the monitor upon receipt of the display authorization signal from the central processing unit.

19. The synchronized television display system according to claim 17, wherein the central processing unit executes programmatic code which performs the function of causing the video switch to provide the monitor with a video signal from a camera determined in accordance with previously stored switching instructions, the switching instructions including at least one display time duration for which the monitor will display the video signal for a corresponding camera, wherein the central processing unit generates the display authorization signal upon the expiration of a display time duration and upon receipt of the synchronization signal.

20. The synchronized television display system according to claim 17, wherein the synchronization signal is provided to the central processing unit as an interrupt signal.

21. A synchronized television display system as recited in claim 15, wherein said synchronization circuit comprises a rectifier connected to said AC line sensing device to rectify the signal from said AC line sensing device, a switch connected to said rectifier, said switch being enabled when the signal from said rectifier is greater than a predetermined level and disabled when the signal from said rectifier is less than the predetermined level, and a pulse generating circuit connected to said switch, said pulse generating circuit generating the synchronization signal each time said switch is enabled.

22. A synchronized television display system as recited in claim 15, wherein said synchronization unit is adapted to generate a synchronization signal corresponding to a phase of the AC line signal.

23. A synchronized television display system as recited in claim 15, wherein said video selection unit switches the video signal generated by a selected camera from said plurality of cameras to said monitor during a vertical blanking interval of said monitor.

* * * * *